United States Patent [19]

Bassi

[11] 4,386,949
[45] Jun. 7, 1983

[54] CONNECTOR FOR AN AIR FILTER ASSEMBLY

[75] Inventor: Alberto Bassi, Turin, Italy

[73] Assignee: ITW Fastex Italia S.p.A., Turin, Italy

[21] Appl. No.: 308,212

[22] Filed: Oct. 2, 1981

[30] Foreign Application Priority Data

Nov. 5, 1980 [IT] Italy .................. 25771 A/80

[51] Int. Cl.³ ............................................. B01D 46/42
[52] U.S. Cl. ................................. 55/507; 55/385 R;
55/505; 55/509; 55/DIG. 28; 403/141;
403/316
[58] Field of Search .................. 55/385 R, 505, 506,
55/507, 509, 510, DIG. 28; 403/122, 141, 142,
143, 316

[56] References Cited

U.S. PATENT DOCUMENTS

| | | | |
|---|---|---|---|
| 1,943,592 | 1/1934 | Farmer | 55/385 R |
| 3,193,994 | 7/1965 | Buike | 55/507 |
| 3,323,293 | 6/1967 | Santi | 55/385 R |
| 3,355,863 | 12/1967 | Pittsley | 55/505 X |
| 3,413,780 | 12/1968 | Amlott et al. | 55/505 X |
| 3,796,027 | 3/1974 | Gumtow | 55/507 X |
| 4,135,899 | 1/1979 | Gauer | 55/507 X |
| 4,238,974 | 12/1980 | Fawcett | 403/122 X |
| 4,300,928 | 11/1981 | Sugie et al. | 55/507 X |

FOREIGN PATENT DOCUMENTS 863736 3/1961 United Kingdom .................. 55/510

Primary Examiner—Kathleen J. Prunner
Attorney, Agent, or Firm—Trexler, Bushnell & Wolters, Ltd.

[57] ABSTRACT

An arrangement for connecting an air filter for automotive vehicles to an associated carburetor. The filter including a cap and a housing having at least one sleeve projecting from the bottom wall thereof. Said sleeve being closed at its free end by a cross wall provided with a slot which is registerable with complimentary slots in the cap. A connecting device comprising a seat for the end of a pin permanently fixed to said carburetor and projecting from it. The seat is in an insert having on its outer surface two diametrically opposite ribs adapted to engage teeth provided on surfaces facing each other of two diametrically opposite legs when the insert, on moving upwardly, penetrates between the legs, thereby catching the end of the pin. At the end of the connecting device opposite the seat is a head adapted to be received through said registerable slots and rotated relative thereto to thereby secure the assembled filter relative to the carburetor.

4 Claims, 4 Drawing Figures

CONNECTOR FOR AN AIR FILTER ASSEMBLY

The present invention relates to an arrangement for assembling an air filter for automotive vehicles and connecting said filter to the carburetor. At present the connection of the cap and the housing of the filter to the carburetor is made in the factory. The assembly steps for attaching the air filter to the engine will be described hereinafter:

(a) positioning of the seal on the carburetor;

(b) connection of the filter housing to the carburetor by means of nuts screwed on metallic threaded inserts secured to the carburetor and passing through corresponding holes provided in the filter housing;

(c) connection of the cap by means of nuts screwed on threaded studs secured to the filter housing and passing through corresponding holes provided in the cap.

From the above it is seen that the filter and housing of the prior art requires assembly directly on line of all components of the filter, which operation involves a substantial waste of time.

The present invention aims to obviate the above mentioned disadvantage in the assembly of prior art air filters and to provide an arrangement which enables the manufacturer of the filter to preassemble the filter housing, the filtering element, and the cap to enable delivery of the complete filter to the user, ready to be mounted on the carburetor.

More particularly, the arrangement for assembling an air filter for automotive vehicles and connecting said filter to the carburetor according to the invention is characterized in that it comprises at least a sleeve projecting from the bottom wall of said filter housing and closed at its free end by a cross wall provided with a slot; a connecting device comprising a seat for the end of a pin permanently fixed to said carburetor and projecting from it, said seat being provided in an insert provided on its outer surface with two diametrically opposite ribs, two diametrically opposite legs provided with walls facing each other with teeth adapted to engage said ribs on the insert, said insert being able to move axially between said legs with respect to said ribs when said filter is not connected to the said carburetor, a radially extending flange adapted to engage said cross wall of said sleeve and a head having an elongated shape connected to said flange by means of a shank, adapted to pass, in a predetermined position of said connecting device, through said slot of said cross wall and another slot in register with said first slot, provided on said filter cap, and to engage the cap wall in which said second slot is provided on the outer side of said cap when said head is rotated so as not to be aligned with said slot in said cap wall to thereby secure the filter housing and cap relative to one another; and at least a pin projecting from said carburetor and having at its free end a head adapted to engage said seat provided on said insert of said connecting device, an undercut being provided between said head and the remaining portion of said pin to prevent disconnection of said head from said seat when said insert engages its ribs in said teeth of said legs.

The described arrangement enables the manufacturer of the filter to preassemble the various parts of the filter and to deliver thus the complete filter to the user, ready to be mounted on the carburetor in a very simple and quick manner.

The invention will be better understood from the following detailed description, given merely by way of example and therefore in no limiting sense, of two embodiments thereof, referring to the accompanying drawings in which.

Figure 1:
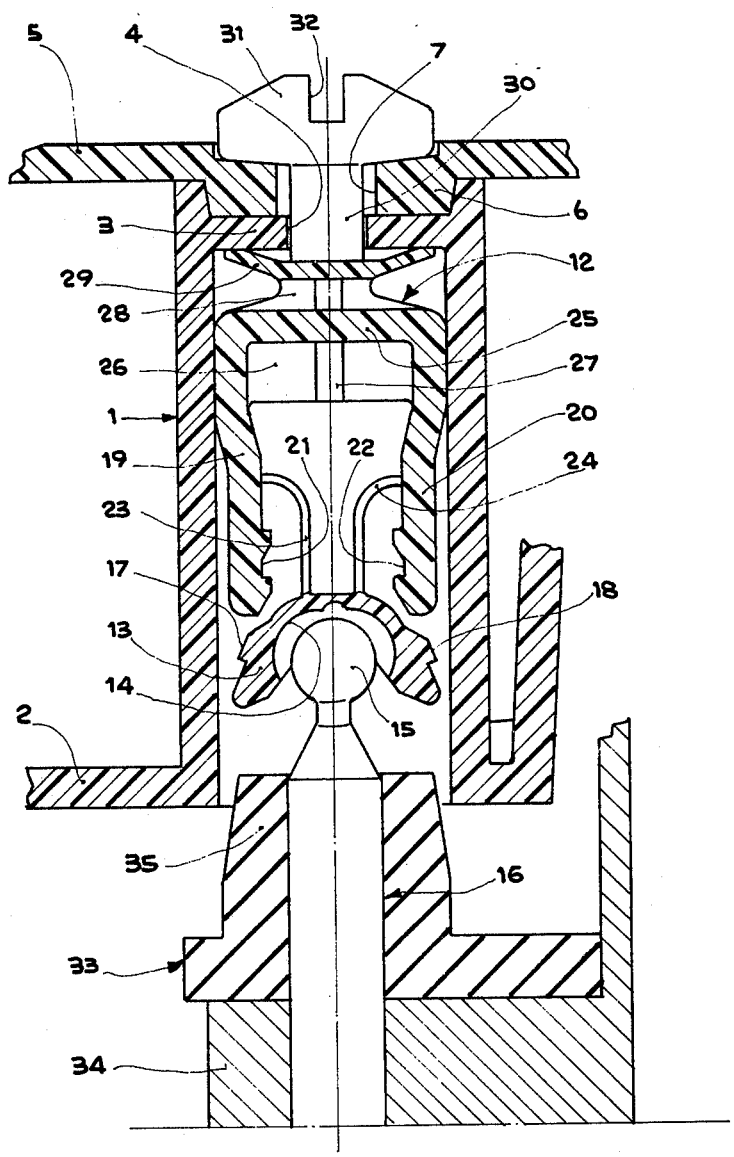
FIG. 1 is a longitudinal sectional view of the arrangement according to the invention, in which, after the air filter has been already preassembled, the connecting device is seen ready to be applied on the pin prearranged on the carburetor.
Figure 2:
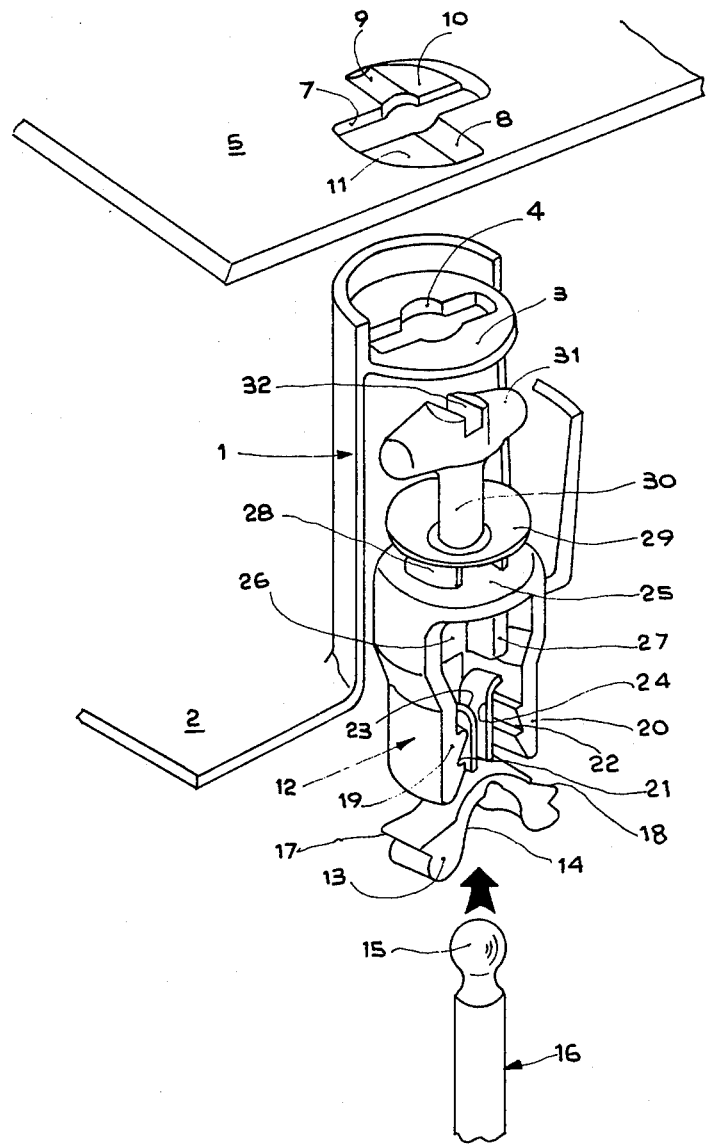
FIG. 2 is an exploded perspective view of the same embodiment of FIG. 1 with a part of the filter broken away in order to better show the connecting device and its various components.

Referring to FIGS. 1 and 2, there is seen tha the connecting arrangement according to the present invention comprises at least a cylindrical sleeve 1 projecting from the bottom wall 2 of the filter housing. Said sleeve 1 has near its free end a cross wall 3 provided with a slot 4 centered on a diameter of the cross wall 3.

The cap 5 for the filter housing has on its lower surface a boss 6 adapted to mate with an upper inner portion of the sleeve 1. At the center of said boss 6 a slot 7 is provided adapted to be registered with the slot 4 in the cross wall 3. The cap 5 has in addition on its outer surface two radially extending concentric grooves 8 and 9 (see FIG. 2) positioned transverse with respect to the slot 7, the common centerline of the two grooves 8 and 9 crossing the center of the slot 7 perpendicularly. Each groove having two edges opposite with respect to the common centerline, one for each groove 8, 9, and flat surfaces 10 and 11 joining each edge of each groove with said slot 7, each flat surface being recessed with respect to the outer surface of the filter cap to act as a ramp.

The connecting device 12 comprises an insert 13 in the form of a cap in whose lower side a seat 14 is provided adapted to receive the ball shaped head 15 of a pin 16 secured to the carburetor. This insert 13 has on its lateral outer surface two diametrically opposite ribs 17 and 18 having a saw tooth cross-section.

The connecting device further comprises two diametrically opposite legs 19 and 20 provided, at their facing surfaces, with two diametrically opposite grooves 21 and 22 having a saw tooth cross-section, adapted to mate the ribs 17, 18 of the insert 13. This insert 13 is connected to the inner side of the legs 19, 20 by means of two flexible strips 23, 24. The legs 19, 20 are connected at their upper end by a disc member 25 stiffened on its lower side by two crossed ribs 26 and 27. Disposed closely above this disc member 25 and joining it by means of a short shank portion 28 is a radially extending flange 29 forms a sealing washer with an upwardly turned hollow portion adapted to engage the lower surface of the cross wall 3 of the sleeve 1. A cylindrical shank 30 concentric with the flange 29 includes at its upper end a hammer shaped head 31 provided with a notch 32. The head is adapted to pass through the slots 4 and 7 only if said hammer shaped head 31 has its centerline in the same direction as the slots 4 and 7.

A seal 33 surrounds the shank of the pin 16 bearing against the carburetor 34 and has a boss 35 centered on the pin which can completely penetrate inside the sleeve 1.

It should be noted that in the case of the described embodiment, in which the filter housing, its cap 5, the sleeve 1 and the connecting device 12 are all of plastic material, the connecting device 12, due to the presence of the strips 23, 24, can be molded integrally, with a substantial advantage both from the standpoint of its manufacture and assembly.

Figure 3:
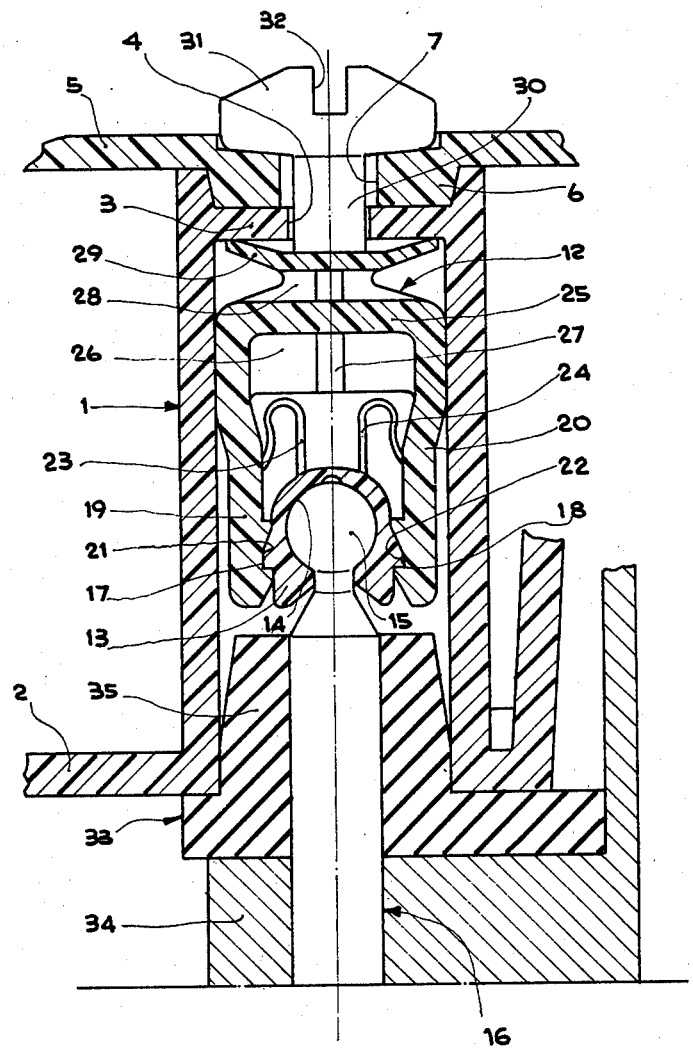
FIG. 3 is a longitudinal sectional view like that of FIG. 1, but with the connecting device applied on the pin fixing the position of the air filter relative to the carburetor.

Referring now to FIG. 3, there is shown the connecting arrangement of FIG. 1 in its normal condition, with the filter assembled on the carburetor. In its assembled condition the insert 13 catches the head of the pin 16 and is inserted between the two legs 19, 20 and its two ribs 17 and 18 mate with the grooves 21, 22 of the legs 19, 20. It can be seen that the lower portion of the sleeve 1 and a portion of the bottom wall 2 of the filter bear on the seal 33. Thus the assembled filter is securely attached to the carburetor 34.

Figure 4:
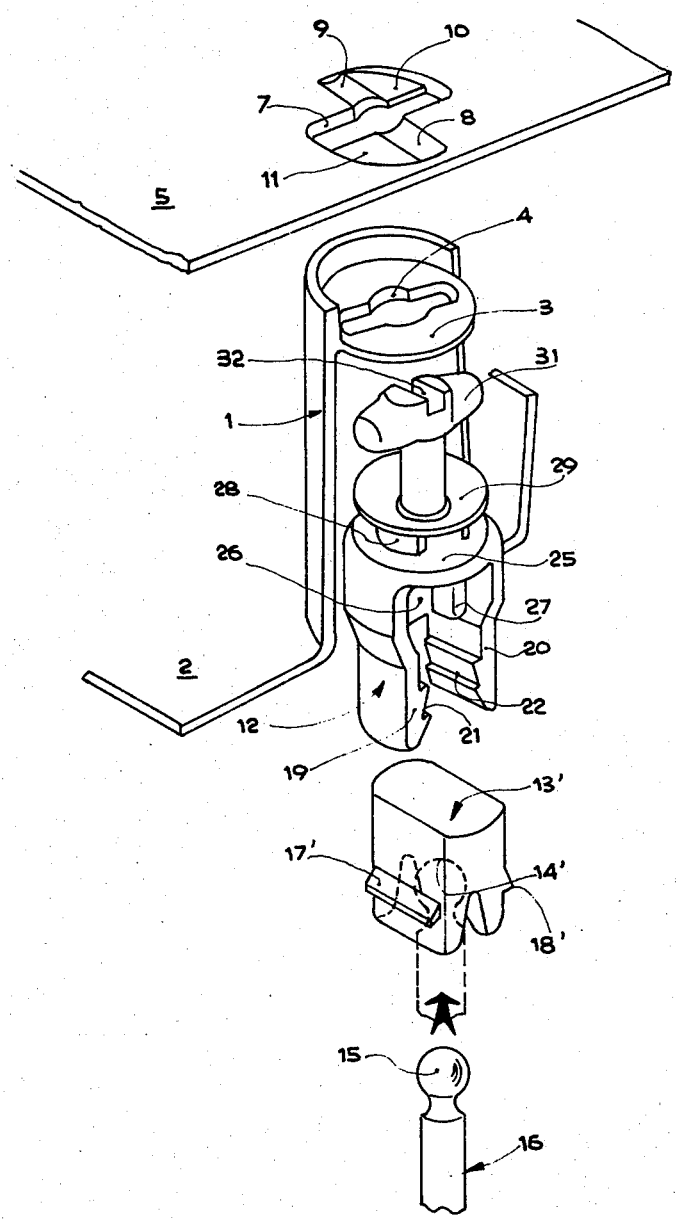
FIG. 4 is an exploded view of an alternative embodiment of the connecting arrangement according to the present invention.

In FIG. 4 an alternate embodiment is shown, in which the flexible strips 23 and 24 connecting the insert to the legs have been eliminated so that the insert 13' is a separate piece and has in addition the feature that it can be applied by a snap action on the head 15 of the pin 16 prior to the assembly of the filter on the carburetor. The insert 13' includes a substantially rigid body with the seat 14' formed therein and outwardly directed ribs 17' and 18'. It is clear, however, that in this case the connecting device 12 cannot be integrally molded.

In order to better understand the advantages of the connecting arrangement according to the present invention with respect to the prior art, there will be described briefly, with reference to FIGS. 1, 2 and 3, the steps necessary for the preassembly of the filter and its subsequent assembly on the carburetor.

The manufacturer of the filter, once the filter housing (comprising one or more sleeves 1) and the cap 5 and the connecting device 12 have been manufactured, can preassemble the whole by inserting a filtering element (not shown) into the filter housing and closing the filter housing by means of its cap 5 by inserting from the underside in the sleeve 1 the connecting device 12 with its hammer shaped head 31 directed so that it passes through the two slots 4 and 7 in register with each other and rotating said hammer shaped head 31 by 90°, e.g., by means of a screwdriver, so that the two lower lateral surfaces of the hammer shaped head slide on the corresponding inclined flat surfaces 10 and 11 until they snap into the grooves 8 and 9. The latter operation, i.e. the rotation of the hammer shaped head 31, makes it possible to press the flange 29 against the lower surface of the cross wall 3 and thus provide a sealing.

At this point the filter is complete and can be sent to the user, who, for purposes of installation, must simply align it above the carburetor with the centerline of the sleeve 1 in register with the centerline of the pin 16 on the carburetor, so that the seat 14 of the insert 13 bears against the ball shaped head 15 of the corresponding pin 16. At this point it is sufficient to exert on the filter a suitable force directed downwardly to raise the insert 13, which simultaneously catches the head 15 of the pin 16 between the legs 19, 20, and to engage by a snap action the ribs 17, 18 in the relevant grooves 21, 22 and thus lock the filter in its final operating position.

In the case of the alternate embodiment shown in FIG. 4, before applying the complete filter on the carburetor, it will be necessary to apply by a snap action the insert 13' on the head 15 of the pin 16 and then to proceed as described above.

Should it be desired to remove the cap 5 from the filter, it is sufficient to rotate the hammer shaped head 31 by 90° so that the head is registered with the slot 7 thereby freeing the cap 5. If then it is desired to remove the whole filter, it is sufficient, with the hammer shaped head 31 in the rotated and registered position relative to the slots 4 and 7, simply to lift the filter so that the connecting device 12 is withdrawn from the sleeve 1.

It might be advisable to provide the pin 16 according to the present invention also with a thread on its shank so as to make it possible to assemble on the carburetor either an air filter provided with the connecting arrangement according to the present invention or a filter designed for a conventional connecting arrangement.

While for the sake of simplicity two diametrically opposite ribs of the insert and two opposite legs cooperating therewith are depicted it is obvious that three or more legs instead of two can be provided without departing from the scope of the invention.

I claim:

1. A connector and air filter assembly for attachment to a carburetor, the filter assembly including a housing having a bottom wall and at least one sleeve projecting upwardly from the bottom wall and a cap having a wall, said sleeve being closed at its free end by a cross wall provided with a slot; said connector including an insert having a seat on its inner surface adapted to receive and be substantially fixed to the headed end of a pin permanently fixed to and projecting from said carburetor, said insert provided on its outer surface with two diametrically opposite ribs, two diametrically opposite legs having walls facing each other with teeth disposed to engage said ribs on the insert when said insert is moved axially between said legs with respect to said ribs, means for connecting said legs together and adapted to engage said cross wall of said sleeve, a head having an elongated shape connected to said means by a shank and arranged to pass through said slot of said cross wall and another slot in said wall of said cap, means in said cap wall adjacent said another slot for positioning said head when said head is out of alignment with said another slot, whereby when said head is passed through said slot in said cross wall and said slot in said cap wall and located in said positioning means and said headed end of said pin is received in said seat and fixed relative to said insert said filter assembly is thereby attached to said carburetor.

2. A connector and an air filter assembly as claimed in claim 1, wherein said insert is connected to said legs by at least one flexible web.

3. A connector and an air filter assembly as claimed in claim 1 wherein said insert is an element independent of said legs and shaped to be snapped on said headed pin before assembling said filter assembly to said carburetor.

4. A connector and an air filter assembly as claimed in claim 1, said means for positioning has two coaxial grooves which are diametrically opposite with respect to said slot provided in said cap, the common axis of said two grooves being perpendicular to the axis of said slot, two edges opposite with respect to said common axis, one for each groove, being connected to the nearest edge section of said slot by means of flat faces recessed with respect to the outer surface of said cap.

* * * * *